United States Patent
Fritz et al.

(10) Patent No.: US 6,737,732 B2
(45) Date of Patent: May 18, 2004

(54) DATA CARRIER WITH AN INTEGRATED CIRCUIT BETWEEN TWO CARRIER LAYERS

(75) Inventors: Reinhard Fritz, Graz (AT); Gerardus Franciscus Cornelis Maria Lijten, Veldhoven (NL); Hubertus Henricus Alphonsus Winters, Weert (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/179,353

(22) Filed: Jun. 25, 2002

(65) Prior Publication Data

US 2003/0016134 A1 Jan. 23, 2003

(30) Foreign Application Priority Data

Jun. 27, 2001 (EP) .............................................. 01890199

(51) Int. Cl.$^7$ ............................................... H01L 29/40
(52) U.S. Cl. ...................... 257/664; 257/691; 257/698; 257/728; 257/724; 257/662
(58) Field of Search ................................. 257/664, 691, 257/698, 728, 724, 662

(56) References Cited

U.S. PATENT DOCUMENTS 6,078,791 A * 6/2000 Tuttle et al. ................ 455/90.1

FOREIGN PATENT DOCUMENTS

| JP | 2002251140 A | * | 9/2002 | .............. G09F/3/10 |
| WO | WO9965002 |  | 6/1999 | ........... G08B/13/14 |

* cited by examiner

Primary Examiner—Nathan J. Flynn
Assistant Examiner—Pershelle Greene
(74) Attorney, Agent, or Firm—Kaw Simons

(57) ABSTRACT

A data carrier (1) for contactless communication comprises a first carrier layer (2) and a second carrier layer (3) which are held together by an adhesive layer (15), wherein an integrated circuit (11) is held in a given position between one of the two carrier layers (2, 3) and the adhesive layer (15), the circuit comprising transmission means (13, 14) which can communicate in a contactless manner with transmission means (7, 8) at the carrier layer, and the transmission means (7, 8) of the carrier layer are connected with electrical conduction to further transmission means (5, 6) by which a contactless communication with a communication station can be carried out, and wherein the final, mechanically stable retention of the integrated circuit (11) in the position reserved for it in the data carrier (1) is realized by means of the adhesive layer (15) only.

2 Claims, 2 Drawing Sheets

DATA CARRIER WITH AN INTEGRATED CIRCUIT BETWEEN TWO CARRIER LAYERS

The invention relates to a data carrier for the contactless communication with a communication station, which data carrier comprises a first carrier layer and a second carrier layer and an adhesive layer situated between said two carrier layers for holding together the two carrier layers, as well as an integrated circuit located in a given position between one of the two carrier layers and the adhesive layer, which integrated circuit comprises circuit transmission means which are in communicative connection with transmission means at the first carrier layer.

A data carrier with the construction described in the opening paragraph above is marketed by applicant and is accordingly known. The known data carrier comprises a bottom layer as the first carrier layer and a covering layer as the second carrier layer. Two capacitor plates of large surface area in relation to the surface area of the bottom layer are provided at the bottom layer as the first transmission means, by which a contactless communication with a communication station can be achieved. A respective capacitor plate also provided on the bottom layer and of small surface area in relation to the surface area of the bottom layer is connected to each of the two large-area capacitor plates provided at the bottom layer. A communication with two circuit capacitor plates provided as circuit transmission means at the integrated circuit is possible by means of these two small-area capacitor plates. The integrated circuit in the known data carrier is connected to the bottom layer in a mechanically stable manner by means of a separate, small-area adhesive joint which is provided in the region of the two small-area capacitor plates, and is accordingly retained in a given position reserved for the integrated circuit in the known data carrier. The adhesive layer lying between the bottom layer and the covering layer here supports the retention of the integrated circuit in the position reserved for it.

It is a disadvantage of the known data carrier that a partial application of an adhesive for fastening the integrated circuit is necessary for realizing the adhesive joint envisaged between the bottom layer and the integrated circuit, which constitutes an additional process step in the manufacture of the data carrier. An exact positioning of the adhesive application means with respect to the bottom layer of the data carrier is necessary here for the partial application of the adhesive in the manufacture of the data carrier, as is an exact positioning of the integrated circuit with respect to the bottom layer of the data carrier, which necessitates a high accuracy and accordingly a comparatively high expenditure. Furthermore, an exact dispensing of the quantity of adhesive to be partially provided must be carried out in the manufacture of the known data carrier, which again involves a considerable expenditure. Overall, therefore, the manufacture of the adhesive joint provided between the integrated circuit and the bottom layer requires a considerable expenditure, which is disadvantageous and leads to a high manufacturing cost.

Reference may also be made to the patent document WO 99/65002 A1 in connection with a data carrier with the construction as described in the opening paragraph. Mention may be made here in particular also of the construction of a known data carrier as shown in FIG. 14 and the construction of a known data carrier as shown in FIG. 2 of this patent document.

The invention has for its object to avoid the disadvantageous situations described above and to realize improved data carriers which can be manufactured in a simpler and less expensive manner.

To achieve the object indicated above, inventive features are provided in a data carrier according to the invention such that a data carrier according to the invention can be characterized as follows:

a data carrier which is constructed for contactless communication with a communication station, and which comprises a first carrier layer and a second carrier layer, and which comprises an adhesive layer located between the first carrier layer and the second carrier layer for holding said two carrier layers together, and which comprises an integrated circuit lying in a given position between one of the two carrier layers and the adhesive layer, which integrated circuit comprises circuit transmission means, wherein first transmission means are connected to the first carrier layer, the first transmission means bear at least substantially on the adhesive layer and by means of the first transmission means a contactless communication of the data carrier with a communication station can be implemented, and wherein second transmission means are connected to the first carrier layer, the second transmission means are connected to the first transmission means with electrical conduction and are in operational connection with the circuit transmission means for communication purposes, and wherein the final, mechanically stable retention of the integrated circuit in its given position is realized by means of the adhesive layer only.

A data carrier is realized through the provision of the features according to the invention in a constructionally very simple manner and by means which are simpler than those known from the prior art, in which data carrier the integrated circuit is retained exactly in the position designed for it in the data carrier in a reliable manner, but advantageously without a separate adhesive joint between the integrated circuit and the first carrier layer immediately adjoining the integrated circuit. It is advantageously achieved in a data carrier according to the invention, furthermore, that no process step for the partial application of an adhesive substance for fastening the integrated circuit to the first carrier layer is necessary in the manufacture of the data carrier, which constitutes a simplification of the manufacturing process. The advantage is furthermore achieved that, because a partially applied adhesive is not necessary in the manufacture of the data carrier according to the invention, it is also not necessary to position the integrated circuit, which is to be positioned and to be retained finally in a given position, in a particularly accurate manner during the manufacture of the data carrier. A further advantage is that the absence of a separate small-area adhesive joint between the integrated circuit and one of the two carrier layers of the data carrier means that the data carrier may be of a thinner overall construction.

In a data carrier according to the invention, the integrated circuit may be provided between the first carrier layer and the adhesive layer, in which case it is particularly advantageous if the adhesive layer is first provided over a large area of the second carrier layer before the data carrier is completed. It was found to be particularly advantageous in a data carrier according to the invention, however, if the integrated circuit lies between the adhesive layer and the second carrier layer. This provides the advantage that the adhesive layer may first be provided over a wide area on the first carrier layer in the manufacture of such a data carrier and may also be provided on the transmission means connected to the first carrier layer during this, whereupon the integrated circuit may be laid on the adhesive layer previously provided on the first carrier layer, so that the integrated circuit is retained in a simple and reliable manner in the position reserved for it already during manufacture.

The aspects mentioned above and further aspects of the invention will become apparent from the following description of embodiments and will be explained with reference to these embodiments.

The invention will be explained in more detail below with reference to two embodiments shown in the drawings, to which, however, the invention is not limited.

Figure 1:
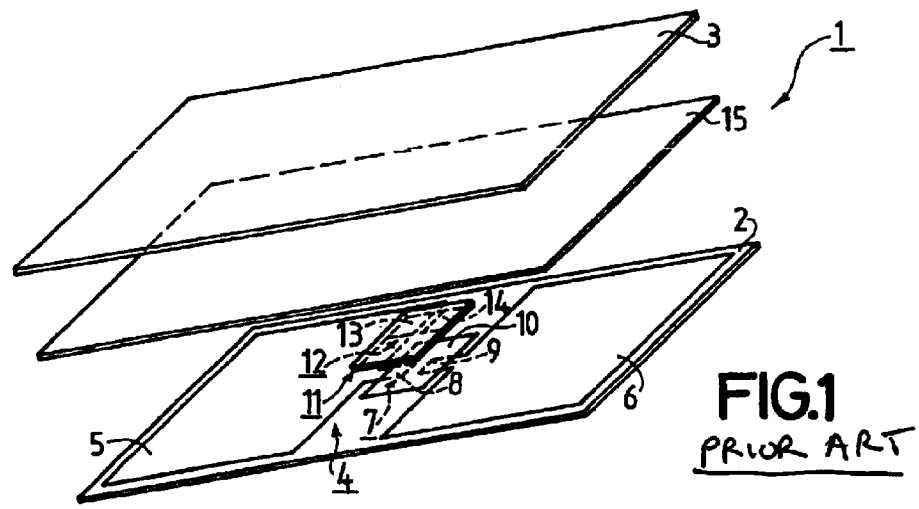
FIG. 1 shows in an exploded view and in an oblique plan view a known data carrier from the prior art.
Figure 2:
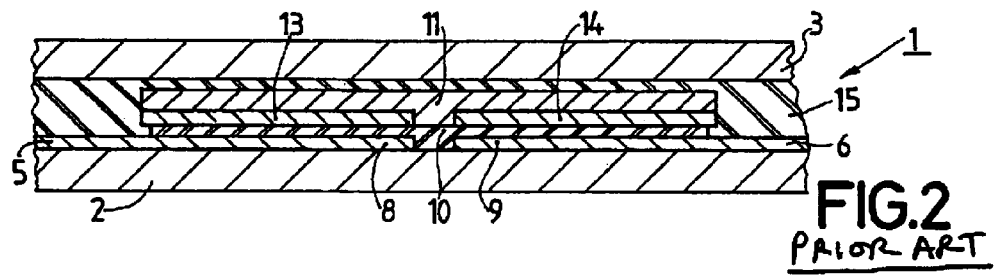
FIG. 2 shows part of the known data carrier of FIG. 1 in cross-section.

FIGS. 1 and 2 show a data carrier 1 whose construction corresponds to the prior art and is known. The data carrier 1 is constructed for contactless communication with a communication station which is not shown in FIGS. 1 and 2.

The data carrier 1 comprises a first carrier layer 2 and a second carrier layer 3. The first carrier layer 2, which may also be denoted the bottom layer, is made of synthetic resin here. The first carrier layer 2, however, may alternatively be made of some other material, for example of paper or other known materials. The second carrier layer 3, which may also be denoted the covering layer, is also made of synthetic resin. This second carrier layer 3, however, may equally well be made of paper or some other known material.

First transmission means 4 are connected to the first carrier layer 2, which means are formed here by two capacitor plates 5 and 6 of large surface area in relation to the surface area of the first carrier layer 2. Instead of the construction of the first transmission means 4 by means of two capacitor plates 5 and 6, said first transmission means may alternatively be realized in the form of a coil which is implemented by printing technology or etching technology or some other technology on the first carrier layer 2. A contactless communication of the data carrier 1 with a communication station can be carried out by the first transmission means 4, i.e. by the two large-area capacitor plates 5 and 6.

Second transmission means 7 are further connected to the first carrier layer 2. The second transmission means 7 are formed here by two capacitor plates 8 and 9 of small surface area in relation to the surface area of the first carrier layer 2. The two small-surface capacitor plates 8 and 9 are formed by strips extending laterally from the large-area capacitor plates 5 and 6, such that the second transmission means 7, i.e. the two small-area capacitor plates 8 and 9, are connected with electrical conduction to the first transmission means 4, i.e. to the large-area capacitor plates 5 and 6.

In the data carrier 1 of FIGS. 1 and 2, a small-area adhesive layer 10 is provided in the region of the second transmission means 7, i.e. in the region of the two small-area capacitor plates 8 and 9, which layer 10 was realized by a partial application of an adhesive substance to the first carrier layer 2 and also partly to the small-area capacitor plates 8 and 9. An integrated circuit, i.e. a chip 11, of the data carrier 1 is retained in a given position reserved for it in the data carrier 1 by means of the small-area adhesive layer 10.

The chip 11 comprises so-termed chip transmission means 12 as the circuit transmission means 12. The adhesive layer 10 is formed by an electrically non-conductive adhesive here. This is important in the present case because two chip capacitor plates 13 and 14 provided on the chip 11 as the chip transmission means 12 are electrically insulated from the small-area capacitor plates 8 and 9 of the second transmission means 7 in this manner. The small-area capacitor plates 8 and 9 are in operational connection with the chip capacitor plates 13 and 14 in an electrostatic manner, so that the chip 11 can carry out a contactless communication with a communication station via the chip capacitor plates 13 and 14, via the small-area capacitor plates 8 and 9, and via the large-area capacitor plates 5 and 6 connected with electrical conduction to the small-area capacitor plates 8 and 9.

In the data carrier 1 of FIGS. 1 and 2, an adhesive layer 15 of large surface area, having practically the same surface area as the two carrier layers 2 and 3, is provided between the first carrier layer 2 and the second carrier layer 3, serving mainly to hold the two carrier layers 2 and 3 together. The large-area adhesive layer 15 in the data carrier 1 performs an additional function in that it supports the mechanically stable retention of the chip 11 in the position reserved for it, which, however, is not absolutely necessary.

The manufacture of the data carrier 1 shown in FIG. 1 proceeds essentially in that first an adhesive substance is provided on part of the first carrier layer 2 fitted with the two large-area capacitor plates 5 and 6 and additionally with the two small-area capacitor plates 8 and 9, after which the chip 11 is laid on the first carrier layer 2 in the region of the part previously provided with the adhesive, whereupon the provided adhesive is cured, which leads to the formation of the small-area adhesive layer 10 and thus to the mechanically stable retention of the chip 11 on the first carrier layer 2. In a next step, an adhesive is provided over the large area of the intermediate product obtained as described above, whereupon the second carrier layer 3 is laid on the large-area adhesive. The large-area adhesive is subsequently cured, which forms the large-area adhesive layer 15 and thus achieves a mechanically stable union of the two carrier layers 2 and 3.

The data carrier 1 of FIG. 1 has the disadvantage that a separate, small-area adhesive layer 10 must be realized for keeping the chip 11 in place on the first carrier layer 2, which represents an additional effort and which is disadvantageous if as thin as possible a data carrier 1 is to be manufactured.

Figure 3:
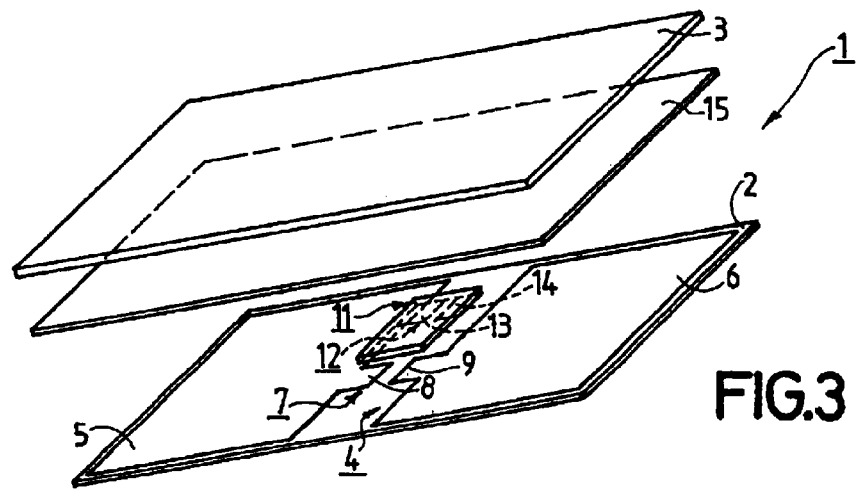
FIG. 3 shows a data carrier of a first embodiment of the invention in the same manner as FIG. 1.
Figure 4:
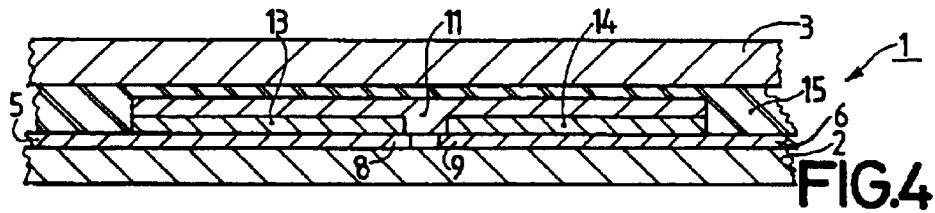
FIG. 4 shows part of the data carrier of FIG. 3 in the same manner as FIG. 2.

The data carrier 1 in FIGS. 3 and 4 provides a solution without the application of a separate, small-area adhesive layer for holding the chip 11 against the first carrier layer 2. In the data carrier 1 of FIGS. 3 and 4, the final, mechanically stable retention of the chip 11 in the position reserved for it in the data carrier 1 is realized by means of the large-area adhesive layer 15 only. This is possible because the chip 11 is directly positioned on the first carrier layer 2 in the manufacture of the data carrier 1 shown in FIGS. 3 and 4, and the chip capacitor plates 13 and 14 enter into an electrically conductive ohmic contact with the two small-area capacitor plates 8 and 9 in the data carrier 1 of FIGS. 3 and 4. An embodiment may alternatively be chosen, however, in which an insulating layer is provided on the chip 1 as a protective layer, in which case the chip capacitor plates 13 and 14 will communicate in a contactless manner with the small-area capacitor plates 8 and 9. After the chip 11 has been laid on the first carrier layer 2, therefore, the chip 11 remains in the position chosen for it in that the first carrier layer 2 and the chip 11 laid thereon are kept free from impacts and other interferences. In a next step, the second carrier layer 3 provided over a large area with an adhesive is carefully and accurately laid on the first carrier layer 2 which supports the chip 11. Then the adhesive now present between the first carrier layer 2 and the second carrier layer 3 is cured, which forms the adhesive layer 15. A reliable union of the two carrier layers 2 and 3 is safeguarded by the adhesive layer 15 in the data carrier 1 of FIGS. 3 and 4. It is additionally achieved by the large-area adhesive layer 15 in the data carrier 1 of FIGS. 3 and 4 that the final, mechanically stable retention of the chip 11 in the position reserved for it is achieved by the large-area adhesive layer 15.

The manufacture of the data carrier 1 of FIGS. 3 and 4 may proceed such that the chip 11 is laid on the first carrier layer 2, and partly also on the two small-area capacitor plates 8 and 9 during this, whereupon it is provisionally retained to the first carrier layer 2, for example by means of a laser weld.

Figure 5:
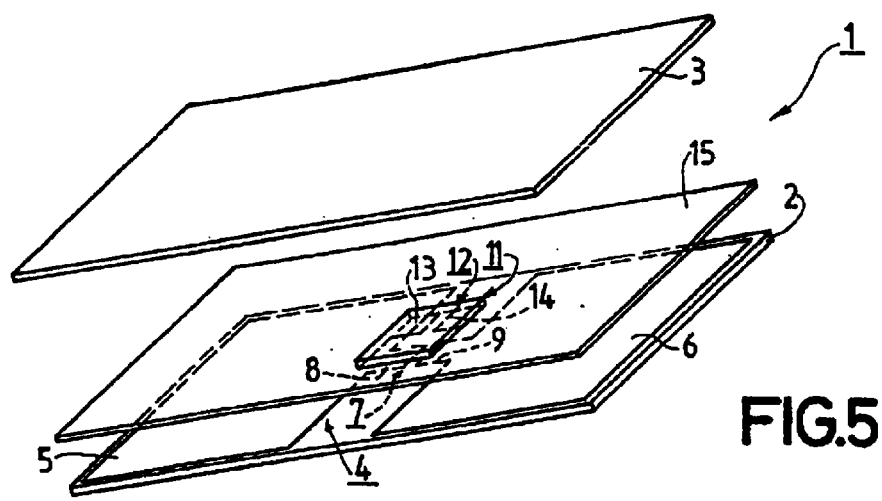
FIG. 5 shows a data carrier of a second embodiment of the invention in the same manner as FIGS. 1 and 3.
Figure 6:
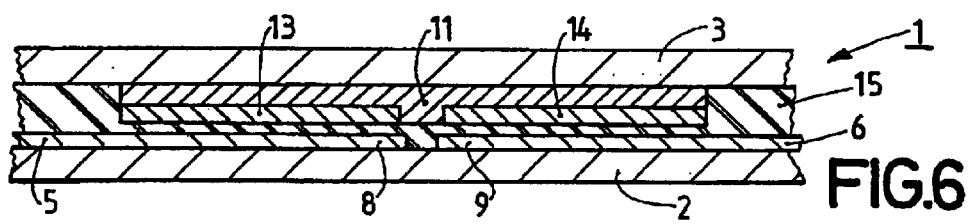
FIG. 6 shows part of the data carrier of FIG. 5 in the same manner as FIGS. 2 and 4.

The data carrier 1 of FIGS. 5 and 6 is an embodiment modified with respect to the data carrier 1 of FIGS. 3 and 4, i.e. in that the adhesive layer 15 in the data carrier 1 of FIGS. 5 and 6 was realized through the application of an adhesive substance on the first carrier layer 2 and simultaneously therewith on the two large-area capacitor plates 5 and 6 and on the two small-area capacitor plates 8 and 9. In the manufacture of the data carrier 1 of FIGS. 5 and 6, an adhesive is provided over a wide area on the first carrier layer 2 and the capacitor plates 5, 6, 7, 8 present thereon, after which the chip 11 is laid on the previously applied adhesive. Then the second carrier layer 3 is carefully and accurately laid on the adhesive previously provided over said wide area. In a next step, the adhesive provided over the wide area is cured, whereby the large-area adhesive layer 15 is formed. The adhesive material is chosen such here that the adhesive layer 15 forms a dielectric and is electrically insulating. Alternatively, however, an adhesive material may be used for which no curing is necessary, in which case the chip 11 is already connected to the first carrier layer 2 in a stable manner after being laid on the adhesive material, i.e. the adhesive layer 15.

The large-area adhesive layer 15 of the data carrier 1 of FIGS. 5 and 6 safeguards a satisfactory union of the two carrier layers 2 and 3. In addition, the large-area adhesive layer 15 achieves that the chip 11 is reliably held in the position reserved for it without additional means. The data carrier 1 of FIGS. 5 and 6 has the advantage that the adhesive material provided over a wide area for realizing the wide-area adhesive layer 15 on the first carrier layer 2 safeguards a reliable positioning of the chip 11 during the manufacture of the data carrier 1 already.

In the two data carriers 1 according to the invention described above, the small-area capacitor plates 8 and 9 of the second transmission means 7 are formed by laterally projecting tags of the large-area capacitor plates 5 and 6 of the first transmission means 4. It should be noted that the first transmission means 4 and the second transmission means 7 may alternatively be formed each by two rectangular capacitor plates without laterally projecting tags, in which case one portion of each of the two rectangular capacitor plates will belong to the first transmission means and another portion to the second transmission means.

It may further be noted that the large-area adhesive layer 15 need not necessarily be realized by means of a non-conductive adhesive material. A large-area adhesive layer 15 may alternatively be formed with an anisotropically conductive adhesive material.

It should further be noted that at least one further layer may be provided at the outer side of each of the two carrier layers 2 and 3 held together by the large-area adhesive layer 15 and enclosing an integrated circuit 11 between them in the data carrier 1 according to the invention, for example a protective layer or a layer which is particularly suitable for being imprinted.

It should further be noted that the integrated circuit in a data carrier 1 according to the invention need not necessarily be a chip 11, i.e. an integrated circuit 11 manufactured in the silicon technology or the silicon/germanium technology, but that alternatively an integrated circuit 11 manufactured in polymer technology may be provided.

What is claimed is:

1. A data carrier (1)

which is constructed for contactless communication with a communication station, and which comprises a first carrier layer (2) and a second carrier layer (3), and which comprises an adhesive layer (15) located between the first carrier layer (2) and the second carrier layer (3) for holding the two carrier layers (2, 3) together, and which comprises an integrated circuit (11) lying in a given position between one of the two carrier layers (2, 3) and the adhesive layer (15), which integrated circuit (11) comprises circuit transmission means (12), wherein first transmission means (4) are connected to the first carrier layer (2), the first transmission means (4) bear at least substantially on the adhesive layer (15) and by means of the first transmission means (4) a contactless communication of the data carrier (1) with a communication station can be implemented, and wherein second transmission means (7) are connected to the first carrier layer (2), the second transmission means (7) are connected to the first transmission means (4) with electrical conduction and are in operational connection with the circuit transmission means (12) for communication purposes, the second transmission means (7) including a plurality of capacitor plates (8, 9) and the chip transmission means (12) including a plurality of capacitor plates (13, 14) that are in direct electrically conductive contact with the capacitor plates (8, 9) of the second transmission means (7), and wherein the final, mechanically stable retention of the integrated circuit (11) in its given position is realized by means of the adhesive layer (15) only.

2. A data carrier (1) as claimed in claim 1, wherein the integrated circuit (11) is positioned between the adhesive layer (15) and the second carrier layer (3).

* * * * *